United States Patent
Kranich

(10) Patent No.: US 7,890,740 B2
(45) Date of Patent: Feb. 15, 2011

(54) PROCESSOR COMPRISING A FIRST AND A SECOND MODE OF OPERATION AND METHOD OF OPERATING THE SAME

(75) Inventor: Uwe Kranich, Kirchheim (DE)

(73) Assignee: Globalfoundries Inc., Grand Cayman (KY)

( * ) Notice: Subject to any disclaimer, the term of this patent is extended or adjusted under 35 U.S.C. 154(b) by 385 days.

(21) Appl. No.: 11/874,402

(22) Filed: Oct. 18, 2007

(65) Prior Publication Data

US 2008/0244137 A1 Oct. 2, 2008

(30) Foreign Application Priority Data

Mar. 30, 2007 (DE) .................. 10 2007 015 507

(51) Int. Cl.
*G06F 9/48* (2006.01)
(52) U.S. Cl. ................ 712/244; 712/43; 712/228; 712/229
(58) Field of Classification Search ......... 710/260–269; 712/43, 228, 229, 244; 713/1, 2
See application file for complete search history.

(56) References Cited

U.S. PATENT DOCUMENTS

| | | | |
|---|---|---|---|
| 5,721,931 A * | 2/1998 | Gephardt et al. ............ | 710/260 |
| 6,105,101 A * | 8/2000 | Hester et al. ............... | 710/260 |
| 6,385,718 B1 * | 5/2002 | Crawford et al. ........... | 712/227 |
| 6,826,760 B1 * | 11/2004 | Hunt et al. .................. | 719/328 |
| 7,444,500 B1 * | 10/2008 | Jones ......................... | 712/228 |
| 7,523,446 B2 * | 4/2009 | Keniston .................... | 717/129 |
| 2008/0155542 A1 * | 6/2008 | Maigne et al. .............. | 718/100 |

OTHER PUBLICATIONS

Joseph M. Link, Trampolines for Embedded Systems, Dr. Dobbs Journal, Sep. 1, 2001.*
TriCore™ 1 32-bit Unified Process Core User's Manual, V1.3.5, Feb. 2005, p. 3-333.
"A Virtual Instruction Set Interface for Operating System Kernels," by John Criswell et al.—Workshop on the Interaction between Operating Systems and Computer Architecture, Boston, Massachusetts, 2006.
TriCore™ 1 32-bit Unified Process Core User's Manual, vol. 1: v1.3 Core Architecture, Feb. 2005.
TriCore™ 1 32-bit Unified Process Core User's Manual, vol. 2: v1.3 Instruction Set, Feb. 2005.

* cited by examiner

*Primary Examiner*—William M Treat
(74) *Attorney, Agent, or Firm*—Williams, Morgan & Amerson, P.C.

(57) ABSTRACT

A processor comprises a first mode of operation and a second mode of operation. A state of the processor in the first mode of operation comprises a first plurality of variables. The first plurality of variables comprises a return address. A state of the processor in the second mode of operation comprises a second plurality of variables in addition to the first plurality of variables. The processor is configured to perform, in case of an interrupt or exception occurring during the second mode of operation, the steps of saving the second plurality of variables and the return address to a buffer memory, replacing the return address with an address of a trampoline instruction, and switching into the first mode of operation. These steps are performed independently of an operating system. The trampoline instruction is adapted to switch the processor from the first mode of operation to the second mode of operation, to read the second plurality of variables and the return address from the buffer memory and to jump to the return address.

20 Claims, 3 Drawing Sheets

PROCESSOR COMPRISING A FIRST AND A SECOND MODE OF OPERATION AND METHOD OF OPERATING THE SAME

BACKGROUND OF THE INVENTION

1. Field of the Invention

The present disclosure relates to the field of computer processors, and, in particular, to a processor comprising a first and a second mode of operation.

2. Description of the Related Art

In modern computer systems, processors are employed which comprise a plurality of instructions. The processor reads instructions and data from a system memory connected to the processor and modifies the instructions and/or data in accordance with the instructions. The system memory may comprise volatile but quickly accessible memory devices, such as RAMs, as well as slow but permanent memory devices, such as hard disks. Moreover, the computer may receive input from devices such as a keyboard, a mouse and/or a network connection and may provide output to devices such as a monitor, one or more loudspeakers and/or a printer. In most computer systems, a specialized computer program, which is denoted as an "operating system," is employed to control the processing of various programs as well as the transfer of data between the components of the computer system.

FIG. 1a shows a schematic block diagram of a computer system 100 according to the state of the art. The computer system 100 comprises a processor 101, a system memory 107 and one or more input/output devices 108. Arrows 106 schematically indicate the transfer of data between the processor 101, the system memory 107 and the input/output device(s) 107.

The processor 101 comprises a plurality of registers 102, 103, 104, 105. Data may be read from the system memory 107 into the registers 102-105, and data in the registers 102-105 may be written to the system memory 107. The processor 101 may comprise instructions adapted to modify the contents of the registers 102-105, as well as instructions to transfer data between the registers 102-105 and the system memory 107 and/or between the registers 102-105. Moreover, instructions which perform a combination of such tasks may be provided. Typically, the processor 101 may access data in the registers 102-105 much faster than data stored in the system memory 107.

Therefore, in order to increase the performance of the computer system 100, it may be desirable to increase the number of registers of the processor 101. In particular, media processing, including 3D graphics, can benefit significantly from a greater number of registers.

In computer systems according to the state of the art, however, an increase of the number of registers or any other additional state of the processor 101 may require a modification of the operating system, as will be explained in the following with reference to FIG. 1b.

FIG. 1b shows a schematic flow diagram of a task 201 running on the processor 101 in the computer system 100 according to the state of the art. The task 201 comprises a plurality of instructions 210-215 which are to be processed sequentially by the processor 101. Hence, the processor 101 proceeds from instruction 210 to instruction 211 and from instruction 211 to instruction 212.

While the task 201 is processed, for example, during or after the processing of instruction 212, an interrupt or exception may occur, which is indicated schematically by arrow 230 in FIG. 1b. An exception may be generated in case of an error during the processing of instruction 212, for example, in case of a division by zero or in case of an error message from the system memory 107, such as a page fault. Exceptions may also be generated regularly by instructions of the task 201, for example by instruction 212. A typical application of an exception generated by the task 201 is a call of the operating system of the computer system 100. Interrupts may be generated by events originating from devices other than the processor 101, for example, by input into the input/output device 108, or by a synchronization request of the input/output device 108. If multitasking is performed in the computer system 100, interrupts generated by a timing circuit may be employed to alternately activate the various tasks, which may be processes or threads.

In case of an interrupt or exception, the execution of the task 201 may be interrupted and an interrupt routine 202, which may, for example, be part of the operating system, is executed. The interrupt routine 202 comprises a plurality of instructions 220-225. These instructions are processed sequentially. After processing the last instruction 225 of the interrupt routine 202, processing of the task 201 is continued at the instruction following the instruction 212 at which the interrupt occurred, i.e., in the above example, at instruction 213.

The interrupt routine 202 may modify the content of the registers 102-105 of the processor 101. In order to insure that the task 201 will function properly in spite of the interrupt or exception, after the occurrence of the interrupt or exception, the content of the registers 102-105 is copied to a storage location in the system memory 107. Before the execution of the task 201 is continued, the content of the storage location is read back into the registers 102-105. Thus, when the execution of the task 201 is continued by executing the instruction 213, the registers 102-105 may comprise substantially the same data as if the instruction 213 would have been executed immediately after instruction 212.

In computer systems 100 according to the state of the art, copying of the content of the register to the storage location and back is effected by instructions provided in the interrupt routine 202, which are implemented as part of the operating system of the computer system 100. Hence, in case additional registers are provided in the processor 101, modifications of the operating system may be required to insure that, in the event of an interrupt or exception, the content of all registers is correctly stored in the system memory and read back into the registers after the completion of the interrupt routine. If a manufacturer of computer processors creates a new processor providing extended features compared to its predecessor, such features, when using additional processor states, i.e., additional registers, may not be reasonably used until manufacturers of operating systems implement support for the added features.

It is, therefore, an object of the present disclosure to provide a computer processor having a second mode of operation wherein the second mode of operation may be used without there being a need for modifications of an operating system providing support only for a first mode of operation of the processor.

The present disclosure is directed to various methods and devices that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

According to one illustrative embodiment, a processor comprises a first mode of operation and a second mode of operation. A state of the processor in the first mode of operation comprises a first plurality of variables. The first plurality of variables comprises a return address. A state of the processor in the second mode of operation comprises a second plurality of variables in addition to the first plurality of variables. The processor comprises a trampoline instruction. The processor is configured to perform, in case of an interrupt or exception occurring during the second mode of operation, the steps of saving the second plurality of variables and the return address to a buffer memory, replacing the return address with an address of the trampoline instruction, and switching into the first mode of operation. These steps are performed independently of an operating system. The trampoline instruction is adapted to switch the processor from the first mode of operation to the second mode of operation, to read the second plurality of variables and the return address from the buffer memory and to jump to the return address.

According to another illustrative embodiment, a method of operating a processor having a first mode of operation and a second mode of operation, a state of the processor in the first mode of operation comprising a first plurality of variables, the first plurality of variables comprising a return address, a state of the processor in the second mode of operation comprising a second plurality of variables in addition to the first plurality of variables, comprises the following features. In case of an interrupt or exception occurring during the second mode of operation, the second plurality of variables and the return address are saved to a buffer memory, the return address is replaced with an address of a trampoline instruction and the processor is switched to a first mode of operation. This is done independently of an operating system. When the trampoline instruction is called, the processor is switched from the first mode of operation to the second mode of operation, the second plurality of variables is read from the buffer memory and the method jumps to the return address.

BRIEF DESCRIPTION OF THE DRAWINGS

The disclosure may be understood by reference to the following description taken in conjunction with the accompanying drawings, in which like reference numerals identify like elements, and in which.

Figure 1A:
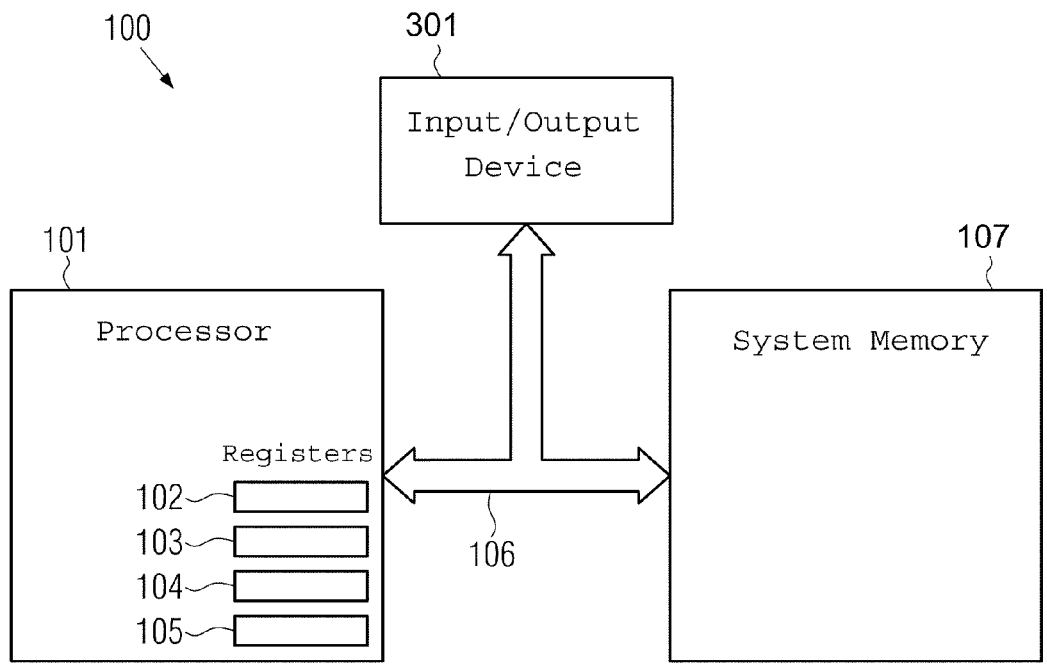
FIG. 1a shows a schematic drawing of a computer system comprising a processor according to the state of the art.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In embodiments disclosed herein, a processor adapted to operate in a first mode of operation as well as in a second mode of operation is provided. The first mode of operation may, in some embodiments, be a compatibility mode wherein the processor provides the functionality of a predecessor model. The second mode of operation can be an extended mode of operation wherein additional functionality may be provided. For example, in the second mode of operation, the processor may provide additional instructions allowing a more efficient processing of three-dimensional graphics, or may provide additional instructions allowing a more efficient cooperation between the processor and further components of the computer, such as special support hardware, coprocessors or additional general purpose processors of a different type than the main processor.

The processor can be adapted to handle data representative of the state of the processor in the second mode of operation in a manner transparent to the operating system. Such data may, for example, comprise contents of a set of registers of the processor which is used only in the second mode of operation, or can comprise data from a device cooperating with the processor, for example the content of registers of special support hardware, one or more coprocessors and/or additional general purpose processors of the computer.

Whenever an interrupt or exception occurs while the processor is in the second mode of operation, the processor saves data representative of the state of the processor which may not be used in the first mode of operation, such as the content of additional registers of the processor or data from a device cooperating with the processor, to an amount of allocated system memory (termed "buffer memory" in the following) and enters the first mode of operation before executing an interrupt routine. Additionally, a return address, which may, for example, be provided in one of the registers, may be replaced by the address of a trampoline instruction such that, after the completion of the interrupt routine, the trampoline instruction is carried out first. The original return address is saved to the buffer memory. The processor is configured to automatically perform these steps independently of the operating system. Thus, the interrupt routine is carried out in the first mode of operation, and the interrupt routine need not be adapted to save data representative of the state of the processor which are not present in the first mode of operation, since this is automatically effected by the processor.

After the completion of the interrupt routine, the trampoline instruction is carried out. The trampoline instruction reads the data representative of the state of the processor which are not used in the first mode of operation, as well as the original return address from the buffer memory, restores the state of the processor before the interrupt or exception, switches the processor to the second mode of operation and initiates the execution of the instruction at the original return address.

Thus, a task running on a computer system, wherein the processor according to the present disclosure is provided, may employ the features of the second mode of operation, while any routines of the operating system are executed in the first mode of operation. Any data relating to the state of the processor in the second mode of operation which are not used in the first mode of operation, such as, for example, the content of additional registers, is automatically handled by the processor, independently of the operating system.

The above-described functionality of the processor may, for example, be provided by means of microprogramming well known to persons skilled in the art, or may be provided by means of specifically-designed circuitry.

Figure 2A:
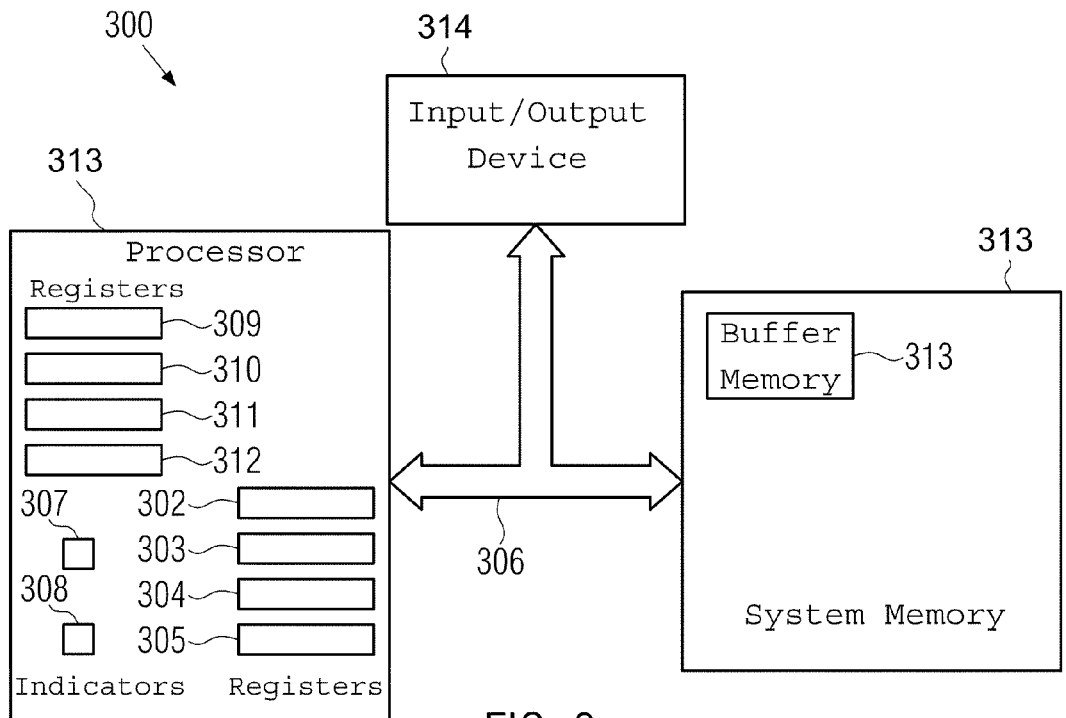
FIG. 2a shows a schematic block diagram of a computer system comprising a processor according to an embodiment disclosed herein.

FIG. 2a shows a schematic block diagram of a computer system 300 comprising a processor 301 according to an embodiment disclosed herein. Additionally, the computer system 300 may comprise a system memory 313 and input/output devices 314. Arrows 306 schematically indicate the transfer of data between the processor 301, the system memory 313 and the input/output devices 314.

Figure 1B:
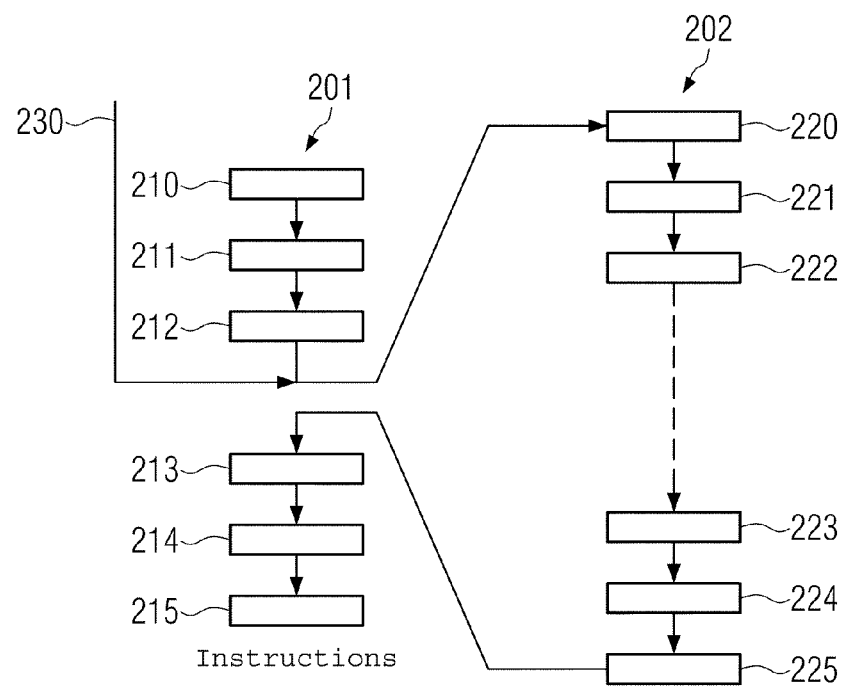
FIG. 1b shows a schematic flow diagram of a program and an interrupt routine running on a processor according to the state of the art.

The processor 301 comprises a first plurality of registers 302-305 and a second plurality of registers 309-312. In the first plurality of registers 302-305, variables representative of a state of the processor 301 in a first mode of operation may be stored. The registers 302-305 may correspond to the registers 102-105 of the processor 101 according to the state of the art described above with reference to FIGS. 1a and 1b, and can be adapted to store variables of a same type as the registers 102-105 of the processor 101. Moreover, the processor 301 may be configured to provide, in a first mode of operation, a set of instructions comprising the set of instructions of the processor 101 according to the state of the art. Thus, in the first mode of operation, the processor 301 may execute binary code provided for the processor 101.

In some embodiments, the processor 301 may be adapted to provide, in the first mode of operation, the functionality of a processor of the type x86 or x86-64, which is well known to persons skilled in the art. In other embodiments, the processor 301 may be configured to provide, in the first mode of operation, the functionality of another type of processor known to persons skilled in the art.

The processor 301 further comprises a second plurality of registers 309-312. In a second mode of operation, which may be an extended mode of operation wherein the processor 301 provides instructions which are not provided by the processor 101, in addition to the instructions provided by the processor 101, the second plurality of registers 309-312 may be used. For example, in the second mode of operation, the processor 301 may provide additional instructions which allow more efficient processing of three-dimensional graphics, and the second plurality of registers 309-312 may be employed to store data which are processed by the additional instructions. Thus, a number of processes of reading and writing data to the system memory 313 may be reduced, which may help increase the speed of operation of the computer system 300 comprising the processor 301.

Additionally, the processor 301 may comprise a control register bit 307 and an indicator bit 308. The indicator bit 308 can be a non-architectural visible bit which indicates whether the processor 301 is currently running in the first mode of operation or in the second mode of operation. The control register bit 307 may indicate whether the second mode of operation is allowed. If the control register bit is set to a first value, for example to the value "ON," programs may use the second mode of operation of the processor 301. If, however, the control register bit is set to a second value, for example to the value "OFF," the processor 301 can be used only in the first mode of operation.

In the system memory 313, a buffer memory 313 may be provided. In the buffer memory 313, the content of the second plurality of registers 309-312 and further information such as, for example, a return address, may be stored in case of an interrupt or exception which occurs while the processor 301 is in the second mode of operation, as will be explained in more detail below. In case of a multi-threaded application, a buffer memory may be allocated for each thread.

In some embodiments, the buffer memory 313 may be allocated by calling a CPU driver routine from the code of a task wherein the second mode of operation of the processor 301 is to be used. The CPU driver routine may be adapted to allocate a memory area of a size sufficient to save the content of the second plurality of registers 309-312 and, optionally, further information. In some embodiments, the buffer memory 313 may be provided in a non-paged pool system memory which will not be swapped to a mass storage device such as, for example, a hard disk by the operating system. In some computer systems 300, an allocation of a memory in the non-paged pool system memory may be allowed only to CPU driver routines.

Advantageously, allocating the memory buffer 313 in the non-paged pool system memory may help to insure that the memory buffer 313 will always remain in the physical memory and no page faults will occur. This may make it easier to write and read, respectively, contents of the second plurality of registers 309-312 and, optionally, further data to and from the buffer memory 313 by means of an atomic operation. Thus, errors which might occur in case of an interrupt or exception while data are written to the memory buffer 313 may be advantageously avoided.

The CPU driver routine may be configured to return a memory address of the memory buffer 313. In some embodiments, the memory address may be a virtual address. This may help to isolate all processes running on the computer system 300 from each other, and may require that, for each process, a separate memory page is used. If the allocation of the memory buffer 313 is not possible, for example, if no memory is available in the non-paged pool memory area, the CPU driver routine may indicate a failure.

In some embodiments, the CPU driver routine for allocating the buffer memory 313 may be part of a CPU driver which may be provided by the processor vendor. In addition to the CPU driver routine for allocating the buffer memory 313, a second CPU driver routine for freeing the buffer memory 313 may be provided. As persons skilled in the art know, CPU driver routines may be loaded by the operating system during the boot of the operating system, and provide functions which may be executed by programs running on the computer system 300. Thus, a program using the second mode of operation may call the CPU driver routines for allocating and freeing the memory buffer 313.

The processor 301 may comprise an enabling instruction for enabling the second mode of operation. The enabling operation receives, as operands, an address, for example, a virtual address, of the buffer memory 313, and an address of a trampoline instruction. The trampoline instruction is provided by the processor 301 and usually is employed in order to restore the content of the second plurality of registers 309-312 after the completion of an interrupt routine, as will be explained in more detail below. The trampoline instruction may be provided in a program using the second mode of operation, and the address of the trampoline instruction may be a pointer to a memory location of the trampoline instruction provided in the program.

The processor 301 may be configured to perform the following steps if the enabling instruction is called. The processor 301 may check the control register bit 307. If the control register bit 307 indicates that the second mode of operation is not allowed, the enabling instruction will generate an illegal instruction fault, and no further steps are performed. Otherwise, the processor may set a first of the second plurality of registers 309-312, for example, the register 309, to the address of the buffer memory 313, and a second of the second plurality of registers, for example, the register 310, to the address of the trampoline instruction. In other embodiments, other ones of the second plurality of registers 309-312 may be used to store the address of the buffer memory 313 and the address of the trampoline instruction. Furthermore, the processor 301 may set the indicator bit 308 to a value indicating that the processor 301 is in the second mode of operation. Subsequently, the processor 301 may execute the next instruction.

In some embodiments, the enabling instruction may be provided in the form of microcode. In other embodiments, specialized circuitry adapted to perform the enabling instruction may be provided in the processor 301.

The processor 301 may further comprise a trampoline instruction. Similar to the enabling instruction, the trampoline instruction may be provided in the form of microcode, or specialized circuitry adapted to perform the trampoline instruction may be provided in the processor 301.

The trampoline instruction may be configured to switch the processor from the first mode of operation to the second mode of operation, to read a plurality of variables which may include a return address from the buffer memory to the second plurality of registers 309-312 and to jump to the return address.

In some embodiments, the processor may be configured to perform the following steps if the trampoline instruction is called. The processor 301 may first check the control register bit 307. If the control register bit 307 is in a state indicating that the second mode of operation of the processor 301 is not enabled, for example, in case the control register bit 307 is in an "OFF" state, the processor 301 may generate an illegal instruction fault, and no further steps are performed. Otherwise, the processor 301 reads the address of the buffer memory 313 from one of the first plurality of registers 302-305, for example, from the register 305, and writes data from the buffer memory 313 to the second plurality of registers 309-312. The data in the buffer memory 313 may comprise, inter alia, a return address and an address of the trampoline instruction. In one embodiment, the address of the trampoline instruction may be written to the register 310.

After writing data from the buffer memory 313 to the second plurality of registers 309-312, the processor 301 may swap the contents of one of the registers 309-312 and one of the first plurality of registers 302-305 wherein the address of the buffer memory 313 is stored. In one embodiment, the processor 301 may swap the contents of registers 305 and 309. After swapping the contents of the registers, the address of the buffer memory 313 may reside in the same register as after the execution of the enabling instruction.

Thereafter, the processor may be switched from the first mode of operation to the second mode of operation, which may be affected by setting the indicator bit 308 to a value indicating that the processor 301 is operating in the second mode of operation, for example, to the value "ON." Finally, the processor 301 may jump to the return address. Thus, an instruction of a task provided at the return address is executed in the second mode of operation of the processor 301.

The processor 301 may be configured to perform the steps of the trampoline instruction as an atomic operation which will not be interrupted even if an interrupt or exception should occur during the execution of the trampoline instruction. This may help to avoid errors which might occur if the execution of the trampoline instruction were interrupted.

The processor 301 may further comprise an end instruction adapted to switch the processor 301 from the second mode of operation to the first mode of operation. For this purpose, the processor 301 may set the indicator bit 308 to a value indicating that the processor 301 is operated in the first mode of operation. In one embodiment, the indicator bit 308 may be set to the value "OFF."

Additionally, the processor 301 may be configured to perform, in case of an interrupt or exception occurring during the second mode of operation, the steps of saving the contents of the second plurality of registers 309-312 and a return address to the buffer memory 313, replacing the return address with an address comprising the trampoline instruction and switching into the first mode of operation. These steps are performed independently of an operating system running on the computer system 300.

In some embodiments, the processor 301 may comprise specialized circuitry for carrying out the above-described steps in case of an interrupt or exception. In other embodiments, the execution of the above-described steps in case of an interrupt or exception may be effected by means of techniques of microprogramming which are well known to persons skilled in the art.

In some embodiments, the processor 301 may be configured to perform the following steps if an interrupt or exception occurs while the indicator bit 308 is set to a value indicating that the processor 301 is in the second mode of operation.

First, the processor 301 may swap the contents of one of the first plurality of registers 301-305 and one of the second plurality of registers 309-312. The registers whose content is swapped can be the same registers as those whose content is swapped during the execution of the trampoline instruction, as described above. For example, the processor 301 may swap the contents of the registers 305 and 309.

Before swapping the contents of the registers 305 and 309, the register 309 may comprise the address of the buffer memory 313, as will be explained in more detail below. Hence, after swapping the contents of the registers 305 and 309, the register 305, which is one of the first plurality of registers 302-305, contains the address of the buffer memory 313. The register 309 contains data provided in the register 305 by the task, the execution of which is interrupted.

After swapping the contents of one of the first plurality of registers 302-305 and one of the second plurality of registers 309-312, the processor 301 may retrieve a return address by means of a method well known to persons skilled in the art and write the return address to one of the second plurality of registers 309-312, for example to the register 311. In some embodiments, the return address may be retrieved from one of the plurality of first registers 302-305. The register 311, or, in other embodiments, another one of the registers 309-312, may be provided for storing the return address, and the processor 301 may be configured to not use that register for other purposes. Thus, a loss of data written by a task to the register 311 which might be caused by writing the return address to the register 311 may be avoided.

Thereafter, the processor 301 may write the contents of the second plurality of registers 309-312 to the buffer memory 313. The address of the buffer memory 313 may be retrieved from the one of the first plurality of registers 302-305, the content of which has been swapped with that of the one of the second plurality of registers 309-312, for example from the register 305. Since the return address is provided in one of the second plurality of registers 309-312, the return address will thus also be stored in the buffer memory 313.

In other embodiments, the processor 301 may be configured to directly store the return address in the buffer memory 313 without writing the return address to one of the second plurality of registers 309-312. Thus, one of the second plurality of registers 309-312 may be advantageously used for other purposes.

After writing the contents of the second plurality of registers 309-312 to the buffer memory 313, the processor 301 may replace the return address with the address of the trampoline instruction, which may be provided in one of the second plurality of registers, for example in the register 310. In some embodiments, this may be done by pushing the address of the trampoline instruction to an exception stack.

Thereafter, the processor 301 may switch into the first mode of operation. Subsequently, the processor 301 may jump to a first instruction of an interrupt routine, such that the interrupt routine is carried out in the first mode of operation.

In the following, the operation of the processor 301 will be described with respect to FIG. 2b, which shows a schematic flow diagram of a task 401 and an interrupt routine 402 running on the computer system 300 comprising the processor 301. The task 401 comprises instructions 410-415, and the interrupt routine 402 comprises instructions 420-425. Additionally, the task 401 comprises the trampoline instruction, which is denoted by reference numeral 450 in FIG. 2b.

The task 401 may be a process running on the computer system 300, or a thread of a process using multi-threading. The task 401 may be configured to use the second mode of operation of the processor 301. For this purpose, the task 401 may comprise, for example, as instruction 410, a call of the CPU driver routine for allocating the buffer memory 313. For simplicity, in FIG. 2b, the call of the CPU driver routine is shown as a single instruction. However, as persons skilled in the art know, in other implementations of the task 401, the call of the CPU driver routine may comprise a plurality of instructions.

Additionally, the task 401 may comprise the enabling instruction of the processor 301, for example as instruction 411. Thus, the processor 301 performs instruction 412 and, optionally, further instructions of the task 401, which are not shown in FIG. 2b, in the second mode of operation.

When the processor 301 executes the enabling instruction 411, the processor 301 writes the address of the buffer memory 313 to a first of the plurality of second registers 309-312, for example to the register 309, the address of the trampoline instruction 450 is written to a second of the second plurality of registers, for example to the register 310, and the indicator bit 308 is set to a value indicating that the processor 301 is in the second mode of operation.

Figure 2B:
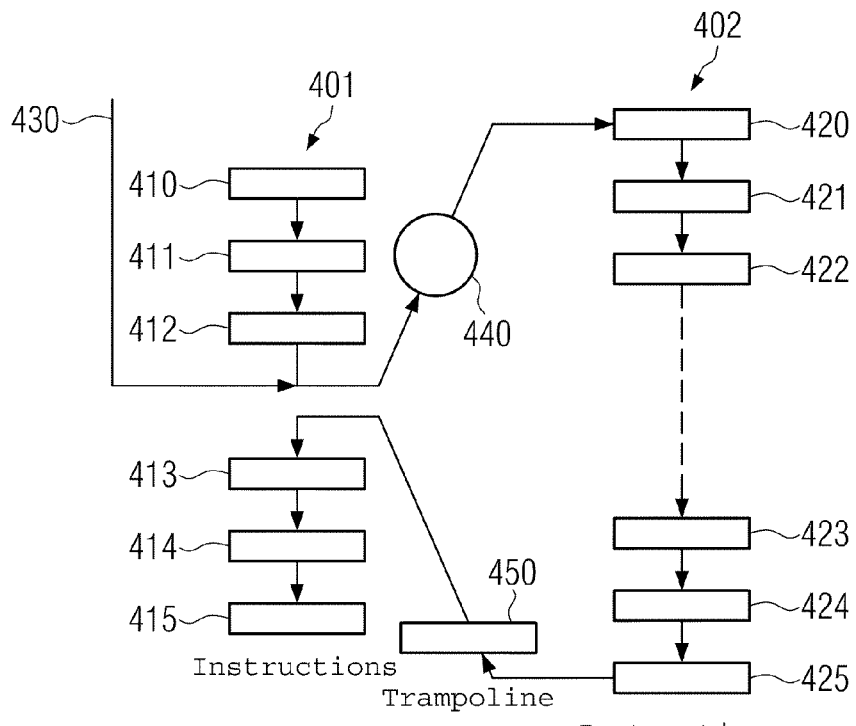
FIG. 2b shows a schematic flow diagram of a program and an interrupt routine running on a processor according to an embodiment disclosed herein.

If an interrupt or exception 430 is occurring during the execution of the task 401, the processor 301 may perform the following steps, which are indicated by reference numeral 440 in FIG. 2b.

The processor 310 may swap the contents of the first of the second plurality of registers 309-312 and one of the first plurality of registers. For example, the contents of the registers 309 and 305 may be swapped. Thereafter, the address of the buffer memory 313 is in the register 305, and the previous content of the register 305 is in the register 309.

Subsequently, the processor 301 may retrieve a return address. The return address may comprise an address of the instruction 412 of the program which would have been executed after the instruction 412 if no interrupt or exception would have occurred during the execution of instruction 412. The return address may be obtained by means of mechanisms of processor 301 which are well known to persons skilled in the art.

The return address and the contents of the second plurality of registers 309-312 may be stored in the buffer memory 313, wherein the processor 301 may obtain the address of the buffer memory 313 from the register 305. As detailed above, the return address may either be written to one of the second plurality of registers 309-312 and stored in the memory buffer 313 together with the content of the other ones of the second plurality of registers 309-312, or may separately be stored in the memory buffer 313.

Thereafter, the processor 301 may replace the return address with the address of the trampoline instruction, wherein the address of the trampoline instruction may be obtained from the second of the second plurality of registers 309-312, for example from the register 310, and switch to the first mode of operation by setting the indicator bit 308 to a value indicating that the processor 301 is in the first mode of operation.

Setting the indicator bit 308 to a value indicating that the processor is in the first mode of operation may help avoid errors which might result if the processor 301 would perform the actions to be performed in case of an interrupt or exception during the second mode of operation while the interrupt routine 402 is executed in the first mode of operation. If the indicator bit 308 would indicate that the processor is in the second mode of operation during the execution of the interrupt routine 402, the processor 301 might perform the steps referred to by reference numeral 440 in FIG. 2b, interpreting the content of the first of the second plurality of registers 309-312 as an address of a buffer memory. Since, however, the first of the second plurality of registers 309-312 might not contain an address of a buffer memory, the processor 301 might incorrectly amend the contents of the system memory 313. Advantageously, this kind of error may be avoided by correctly switching the processor 301 into the first mode of operation before executing the interrupt routine 402.

Subsequently, the processor may execute the first instruction of the interrupt routine 402. This is done in the first mode of operation. The interrupt routine 402 may be part of an operating system which comprises support for the first mode of operation of the processor 301, and which need not support the second mode of operation. Hence, the interrupt routine 402 may comprise instructions adapted to save the contents of the first plurality of registers 302-305 to the system memory 313, and instructions to read the contents of the first plurality of registers 302-305 from the system memory 313 at the end of the execution of the interrupt routine 402. Hence, after the execution of the last instruction 425 of the interrupt routine 402, the contents of the first plurality of registers 302-205, with the exception of the register 305, the content of which has been swapped with the content of the register 312, are identical to their contents after the execution of the instruction 412 of the task 401. The register 305 comprises the address of the buffer memory 313.

The interrupt routine 402, however, need not be adapted to save and restore the content of the second plurality of registers 309-312. The interrupt routine 402 may be part of an operating system which allows multi-tasking and/or multi-threading. In particular, the interrupt routine 402 may be adapted to execute another program or routine which may use the second mode of operation of the processor 301, wherein the contents of the second plurality of registers 309-312 are modified. Since the interrupt routine 402 need not restore the content of the second plurality of registers 309-312, the contents of the second plurality of registers 309-312 may be different from their content after the execution of the instruction 412 of the task 401.

After the completion of the interrupt routine 402, the processor 301 executes the trampoline instruction 450, since the return address has been replaced by the address of the trampoline instruction 450.

When executing the trampoline instruction 450, the processor 301 obtains the address of the buffer memory 313 from the register 305, reads the contents of the second plurality of registers 309-312 which have been stored by the processor 301 after the interrupt or exception 430 from the buffer memory 313, and swaps the contents of registers 305 and 312. Thus, both the first plurality of registers 302-305 and the second plurality of registers 309-312 comprise the same data as after the execution of instruction 412 of the task 401.

Thereafter, the processor may switch from the first mode of operation to the second mode of operation by setting the indicator bit 308 to a value indicating that the processor 301 is in the second mode of operation. Subsequently, the processor 301 may jump to the return address, which may also be retrieved from the buffer memory 313. Hence, the instruction 413 and, thereafter, the other instructions 414 and 415 of the task 401 are executed.

Thus, although the operating system of the computer system 300 comprising the processor 301 and, in particular, the interrupt routine 402 are not adapted to save and restore the contents of the second plurality of registers 309-312, the contents of the second plurality of registers 309-312 are restored after the execution of the interrupt routine 402. Moreover, the interrupt routine 402 is executed in the first mode of operation of the processor 301. Therefore, no adaptations of the operating system to the second mode of operation of the processor 301 are required. The swapping of the first of the second plurality of registers 309-312 and one of the first plurality of registers 302-305 allows applications to use each of the first plurality of registers 302-305, and insures that the address of the buffer memory 313 is stored and retrieved by the interrupt routine 402.

Thus, the address of the buffer memory 313 may be made available to the trampoline instruction in a convenient manner. Moreover, in case the second mode of operation of the processor 301 provides instructions in addition to the instructions provided by the first mode of operation, components of the task 401 which do not require the features of the second mode of operation may be created by means of a compiler or assembler adapted to the first mode of operation, while components of the task 401 using the features of the second mode of operation may be created by means of a compiler or assembler adapted to the second mode of operation. Thus, the processor 301 provides a high degree of compatibility with software created for existing processors which provide only the first mode of operation.

In addition to the instructions described above, the processor 301 may comprise a first mode switching instruction adapted to save the contents of the second plurality of variables to the buffer memory 313 and to switch the processor 301 from the second mode of operation to the first mode of operation. The processor 301 may be configured to perform the first mode switching instruction and the second mode switching instruction as atomic instructions. Thus, errors which might occur if the execution of the first mode switching instruction and/or the second mode switching instruction were interrupted may be advantageously avoided.

In some embodiments, the processor 301 may be configured to perform the following steps while executing the first mode switching instruction. First, the processor 301 may check the control register bit 307. If the control register bit 307 indicates that the second mode of operation of the processor is not allowed, the processor 301 may create an illegal instruction fault, and no further actions are performed.

Otherwise, the processor 301 may swap the contents of the first of the second plurality of registers 309-312 and one of the first plurality of registers 302-305. In some embodiments, the contents of the registers 305 and 312 may be swapped. Thus, the address of the memory buffer 313, which may be provided in register 312, is written to the register 305, and the original content of the register 305 is written to register 312.

Thereafter, the content of the second plurality of registers 309-312 may be written to the buffer memory 313, wherein the processor 301 may obtain the address of the buffer memory 313 from the register 305. Finally, the processor 301 may switch into the first mode of operation by setting the indicator bit 308 to a value indicating that the processor 301 is in the first mode of operation, for example to the value "OFF," and the processor continues with the execution of the next instruction.

The processor 301 may further comprise a second mode switching instruction adapted to read the contents of the second plurality of registers 309-312 from the buffer memory 313 and to switch the processor 301 into the second mode of operation.

In some embodiments, the processor 301 may be configured to perform the following steps when executing the second mode switching instruction. First, the processor 301 may check the control register bit 307. If the control register bit 307 indicates that the second mode of operation of the processor is not allowed, the processor 301 may generate an illegal instruction fault, and no further actions are performed.

Otherwise, the processor 301 may read the contents of the second plurality of registers 309-312 from the memory buffer 313 into the second plurality of registers 309-312. Hereby the address of the memory buffer could be, i.e., in register 305.

Thereafter, the processor 301 may swap the contents of the first of the second plurality of registers and one of the first plurality of registers 302-305. In one embodiment, the processor 301 may swap the contents of the registers 305 and 312. Then, the processor 301 may switch to the second mode of operation by setting the indicator bit 307 to a value indicating that the processor is operated in the second mode of operation. Subsequently, a next instruction can be executed in the second mode of operation.

In some embodiments, each of the first mode switching instruction and the second mode switching instruction may be executed as an atomic operation. This may help to avoid errors which otherwise might occur in case of an interrupt or exception during the execution of the first mode switching instruction or the second mode switching instruction, respectively.

The first mode switching instruction and the second mode switching instruction may be employed in order to implement a program which may switch the processor 301 between the first and the second mode of operation. If the first mode switching instruction is executed, the program will be executed in the first mode of operation until either the enabling instruction or the second mode switching instruction is executed. A program using the first mode switching instruction and/or the second mode switching instruction may comprise further instructions to store the content of the register 305 in the system memory 313 after the execution of the first mode switching instruction and to read the content of the register 305 from the system memory 313 before the execution of the second mode switching instruction. This may be done by means of standard store and load instructions of the first mode of operation of the processor 301. After storing the content of the register 305 in the system memory 313, the program may use each of the first plurality of registers 302-305. Altanatively, the address of the memory buffer 313 may be stored in a variable from which it may be loaded into the register 305 before executing the first and/or the second mode switching instruction.

The present invention is not restricted to embodiments wherein the state of the processor in the first mode of operation is represented by contents of a first plurality of registers, and the state of the processor in the second mode of operation is represented by contents of a second plurality of registers. In other embodiments, the state of the processor in the second mode of operation may comprise a plurality of variables, wherein at least some of the variables are not provided in registers of the processor. Instead, variables representing the state of the processor may comprise data from a device connected to the processor.

In the following, an embodiment wherein the state of the processor comprises, in the second mode of operation, a plurality of variables representative of data from a device connected to the processor will be described with reference to FIG. 3.

Figure 3:
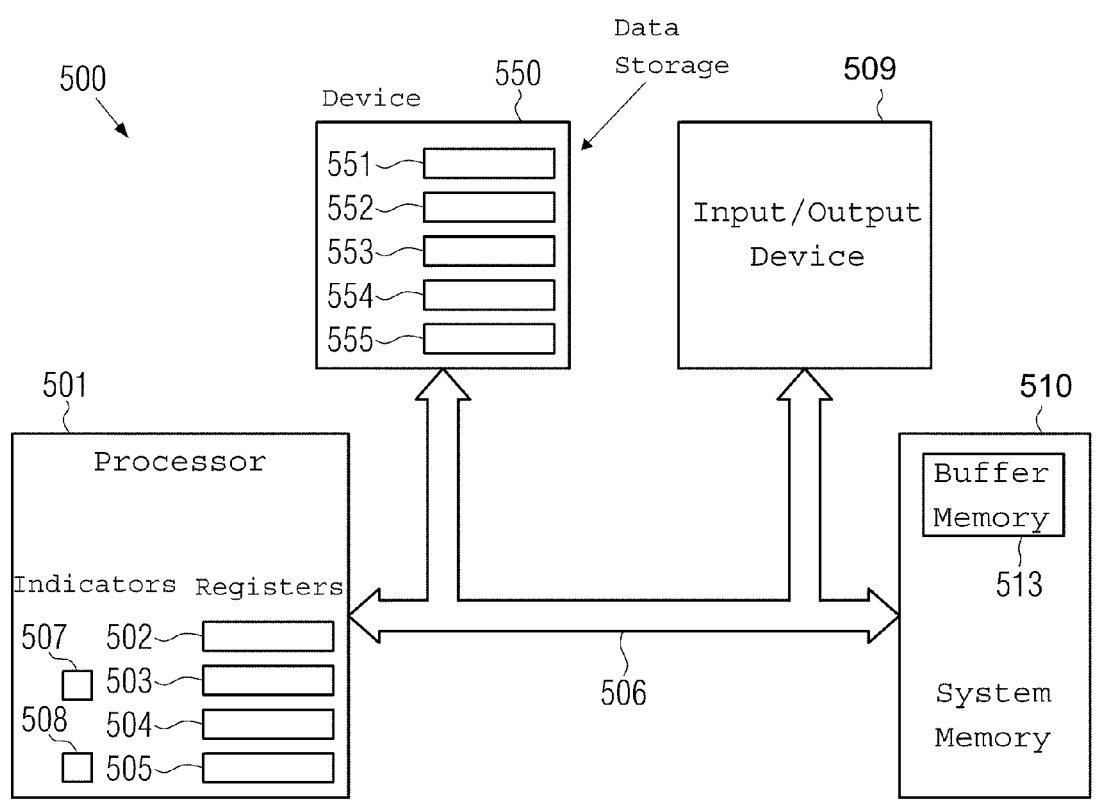
FIG. 3 shows a schematic block diagram of a computer system comprising a processor according to another embodiment disclosed herein.

FIG. 3 shows a schematic block diagram of a computer system 500 comprising a processor 501 according to an embodiment disclosed herein. The computer system 500 further comprises an input/output device 509 similar to the input/output device 314 described above with reference to FIG. 2a, and a system memory 510. Additionally, the computer system 500 comprises a device 550 connected to the processor 501. Arrows 506 indicate connections between the components of the computer system 500.

Similar to the processor 301, the processor 501 comprises a first plurality of registers 502-505, a control register bit 507 and an indicator bit 508. The processor 501 comprises a first mode of operation and a second mode of operation. The processor 501 may be configured to cooperate, in the second mode of operation, with the device 550, and may be configured not to use, in the first mode of operation, features of the device 550. For this purpose, in the second mode of operation, the processor 501 may provide instructions adapted to control the device 550, which instructions are not provided in the first mode of operation. In some embodiments, the device 550 may comprise special support hardware such as graphic processors, video codecs, math processors, physics processors and/or a coprocessor and/or an additional processor of a different type than the processor 501.

The device 550 may comprise a plurality of data storage areas 551-555. In some embodiments, the data storage areas 551-555 may provide a second plurality of registers. In other embodiments, the data storage areas 551-555 may comprise other states of the device 550.

Similar to the processor 301 described above with reference to FIGS. 2a-2b, a CPU driver routine may be provided which allows tasks using the second mode of operation of the processor 501 to allocate a buffer memory 513 in the system memory 510, and a further CPU driver routine may be provided which allows tasks to free the buffer memory 513 at the end of the execution of the task, or in case the second mode of operation is not used by the task any more.

Furthermore, similar to the processor 301 described above with reference to FIGS. 2a-2b, the processor 501 may comprise an enabling instruction for enabling the second mode of operation, a trampoline instruction which may be called in order to restore the contents of the data storage areas 551-555 after the execution of an interrupt routine, and an end instruction for switching the processor 501 from the second mode of operation to the first mode of operation.

The functionality of the enabling instruction, the trampoline instruction and the end instruction may be similar to that of the corresponding instructions of the processor 301 described above with reference to FIGS. 2a-2b. However, in the processor 501, the contents of the data storage areas 551-555 are stored to the buffer memory 513 and retrieved from the buffer memory 313 instead of the contents of the second plurality of registers 309-312.

If an interrupt or exception occurs while the indicator bit 508 indicates that the processor 501 is in the second mode of operation, similar to the processor 301 described above, the processor 501 may perform the steps of saving the content of the data storage areas 551-555 as well as a return address to the buffer memory 513, replacing the return address with an address of the trampoline instruction and switching into the first mode of operation. These steps may be performed independently of an operating system.

Additionally, the processor 501 may comprise a first mode switching instruction for saving the contents of the data storage areas 551-555 to the buffer memory and switching the processor 501 from the second mode of operation to the first mode of operation. Moreover, the processor 501 may comprise a second mode switching instruction adapted to read contents of the plurality of data storage areas 551-555 from the buffer memory 513 and to switch the processor 501 from the first mode of operation to the second mode of operation.

The actions performed by the processor 501 if an interrupt or exception occurs while the processor 501 is in the second mode of operation, as well as the functionality of the first mode switching instruction and the second mode switching instruction, may be similar to the corresponding functionality of the processor 301 wherein, however, the content of the data storage areas 551-555 is stored in the buffer memory 513 and retrieved from the buffer memory 513 instead of the contents of the second plurality of registers 309-312.

The present invention is not restricted to a computer system comprising a single processor, as shown above in FIGS. 2a and 3. Instead, a computer system may comprise a plurality of processors 301 and/or 501. For example, a plurality of processors may be provided in a shared memory multiprocessor system. In a shared memory multiprocessor system, each processor may access the system memory 313, 510 in a transparent manner. Running tasks, which may comprise processes and/or threads, may be moved from a first one of the processors to a second one of the processors. For this purpose, the execution of the program or thread may be interrupted by means of an interrupt or exception. In case the first processor is in the second mode of operation, the processor 301, 501 will automatically store variables representative of the state of the processor in the second mode of operation, such as the contents of a second plurality of registers 309-312 and/or contents of data storage areas 551-555 in a device 550 connected to the processor to a buffer memory 313, 515 and switch into the first mode of operation. Thereafter, an interrupt routine, which may be part of an operating system, may be executed. The interrupt routine may initiate an execution of the task on the second processor. The second processor will then execute the trampoline instruction and read the variables representative of the state of the processor 301, 501 in the second mode of operation from the system memory 313, 510. Hence, the variables representative of the state of the processor in the second mode of operation may be saved and restored in a manner transparent to the operating system if a task is moved between the first and the second processor. The operating system need not comprise any specific adaptations to the second mode of operation of the processors.

The present invention is not restricted to embodiments wherein the trampoline instruction and the second mode switching operation read the variables representative of the state of the processor 301, 501 from the system memory 313 whenever they are executed. In other embodiments, the processor 301, 501 may comprise a mechanism for reading the variables only if one or more of the variables have been amended by the operating system or another program running on the computer system 301. As detailed above, the processor 301, 501 may be configured to modify variables representative of the state of the processor 301, 501 in the second mode of operation such as the contents of the second plurality of registers 309-312 and/or the contents of the data storage areas 551-555 only in the second mode of operation. Therefore, the trampoline instruction and the second mode switching instruction may be adapted to read such values from the buffer memory only if the processor 301, 501 was operated in the second mode of operation by another task since the last execution of the task.

For this purpose, the processor 301, 501 may comprise a counter. In case of a reset of the processor 301, 501, the counter may be set to zero. The processor 301, 501 may be adapted to increment the counter whenever it is switched from the first mode of operation to the second mode of operation. In particular, the counter may be incremented whenever the enabling instruction, the trampoline instruction or the second mode switching instruction is executed. The processor 301, 501 may be equipped with circuitry or microcode adapted for this purpose.

If an interrupt or exception occurs while the processor 301, 501 is in the second mode of operation, the current value of the counter may be stored in the buffer memory 313, 513. In embodiments wherein the processor 301 comprises a second plurality of registers 309-312, the processor 301 may copy the value of the counter to one of the second plurality of registers 309-312. In embodiments wherein the processor 501 is connected to a device 550 comprising a plurality of data storage areas 551-555, the processor 501 may copy the value of the counter to one of the data storage areas 551-555. Thus, when the processor saves the variables representative of the state of the processor 301, 501 to the buffer memory 313, 513, the value of the counter is also saved in the buffer memory 313, 513. In other embodiments, the processor 301, 501 may be adapted to directly write the current value of the counter to the buffer memory 313, 513.

The trampoline instruction and/or the second mode switching instruction can be adapted to read the stored value of the counter from the buffer memory 313, 513, and to compare the read value of the counter with the current value. If the current value of the counter and the value read from the buffer memory are identical, the contents of the second plurality of registers 309-312 and/or the contents of the plurality of data storage areas 551-555 need not be read from the buffer memory 313, 513, since this indicates that the contents of the second plurality of registers 309-312 and/or the contents of the data storage areas 551-555 have not been modified. In case the current value of the counter differs from the stored value of the counter, the contents of each of the second plurality of registers 309-312 and/or the contents of each of the data storage areas 551-555 may be read from the buffer memory 313, 513. This may allow an increase of the speed of operation of the processor 301, 501, since it may help avoid unnecessarily reading data from the buffer memory 313, 513.

In one embodiment, the counter may have a width of 64 bits. Thus, even if one of the trampoline instruction and the second mode switching instruction were carried out every 100 nanoseconds, a wrap around of the counter would occur only after 58,494 years of operation of the processor 301, 501. Thus, errors resulting from a wrap around of the counter may be efficiently avoided.

In embodiments wherein the processor 301, 501 is used in a computer system comprising a plurality of processors such as, for example, a shared memory multiprocessor system, the processor 301, 501 may be configured to store, in case of an interrupt or exception occurring while the processor is operating in the second mode of operation, an identification number of the processor and the current value of the counter to the buffer memory 313, 513. The trampoline instruction and the second mode switching instruction may be adapted to read the content of the second plurality of registers 309-312 and/or the content of the data storage areas 551-555 from the buffer memory 313, 513 only if both the identification number of the processor 301, 501 and the current value of the counter are identical to the values stored in the buffer memory 313, 513. Thus, it may be insured that that the contents of the second plurality of registers and/or the data storage areas 551-555 are always read from the buffer memory 313, 513 if the program or thread is moved to a different processor.

As detailed above, in case an interrupt or exception occurs while the processor 301, 501 is in the second mode of operation, the current return address is replaced with the address of the trampoline instruction. Therefore, the return address may always be the same whenever an interrupt or exception occurs during the execution of a program using the second mode of operation of the processor 301, 501.

In other embodiments, a plurality of trampoline instructions may be provided in a task using the second mode of operation of the processor 301, 501. The processor 301, 501 may be configured to replace the return address with the address of one of the plurality of trampoline instructions if an interrupt or exception occurs while the processor 301, 501 is in the second mode of operation. In one embodiment, the processor 301, 501 may be configured to iterate through the plurality of trampoline instructions.

Thus, after the completion of the interrupt routine, the return address may comprise different addresses. This may help to overcome problems which might occur if an operating system used for a computer system 300, 500 comprising the processor 301, 501 would use the information about identical return addresses to make some assumptions. For example, the operating system might conclude that the task is caught in an endless loop and terminate the task.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A processor comprising a first mode of operation and a second mode of operation, wherein the first mode of operation represents a compatibility mode of operation recognized by an operating system implemented by the processor and the second mode represents an extended mode of operation not recognized by the operating system, wherein a state of said processor in said first mode of operation comprises a first plurality of variables, said first plurality of variables comprising a return address, and wherein a state of said processor in said second mode of operation comprises a second plurality of variables in addition to said first plurality of variables;

wherein said processor comprises a trampoline instruction; said processor being configured to perform, in case of an interrupt or exception occurring during said second mode of operation, the steps of saving said second plurality of variables and said return address to a buffer memory, replacing said return address with an address of said trampoline instruction, and switching into said first mode of operation, said steps being performed independently of the operating system, and wherein said processor is configured to initiate a routine for handling said interrupt or exception in said first mode of operation; and wherein said trampoline instruction is adapted to switch said processor from said first mode of operation to said second mode of operation, to read said second plurality of variables and said return address from said buffer memory and to jump to said return address.

2. The processor of claim 1, wherein said first plurality of variables is representative of contents of a first plurality of registers of said processor.

3. The processor of claim 1, wherein said second plurality of variables comprises at least one variable comprising data from a device connected to said processor.

4. The processor of claim 1, wherein said second plurality of variables comprises at least one variable comprising data from a device connected to said processor.

5. The processor of claim 1, further comprising an enabling instruction for enabling said second mode of operation, said enabling instruction being adapted to set a first of said second plurality of variables to an address of said buffer memory, to set a second of said second plurality of variables to an address of said trampoline instruction, and to switch said processor into said second mode of operation.

6. The processor of claim 5, further being configured to swap said first of said second plurality of variables and one of said first plurality of variables in case of said interrupt or exception occurring during said second mode of operation.

7. The processor of claim 6, wherein said trampoline instruction is further adapted to read said address of said buffer memory from said one of said first plurality of variables and, after reading said second plurality of variables and said return address from said buffer memory, to swap said one of said first plurality of variables and said first of said second plurality of variables.

8. The processor of claim 1, further comprising an end instruction adapted to switch said processor from said second mode of operation to said first mode of operation.

9. The processor of claim 1, configured to perform the steps which are performed in case of an interrupt or exception occurring during the second mode of operation as an atomic operation.

10. The processor of claim 1, configured to execute said trampoline instruction as an atomic operation.

11. The processor of claim 1, further comprising a first mode switching instruction adapted to save said second plurality of variables to said buffer memory and to switch said processor from said second mode of operation to said first mode of operation.

12. The processor of claim 11, wherein said first mode switching instruction is further adapted to swap one of said first plurality of variables and one of said second plurality of variables containing an address of said buffer memory before saving said second plurality of variables to said buffer memory.

13. The processor of claim 10, further comprising a second mode switching instruction adapted to read said second plurality of variables from said buffer memory and to switch said processor from said first mode of operation to said second mode of operation.

14. The processor of claim 13, wherein said second mode switching instruction is further adapted to swap one of said first plurality of variables comprising an address of said buffer memory and one of said second plurality of variables after reading said plurality of second variables from said buffer memory.

15. The processor of claim 1, further comprising a counter and being configured to increment said counter whenever said processor is switched from said first mode of operation to said second mode of operation.

16. The processor of claim 15, configured to store a value of said counter to said buffer memory in case of said interrupt or exception occurring during said second mode of operation, and wherein said trampoline instruction is adapted to read said second plurality of variables from said buffer memory only if said stored value of said counter differs from a current value of said counter.

17. The processor of claim 15, configured to store a value of said counter and a processor identification number to said buffer memory in case of said interrupt or exception, and wherein said trampoline instruction is adapted to read said second plurality of variables from said buffer memory only if at least one of said stored value of said second counter and said stored processor identification number differs from a current value of said counter and a current processor identification number.

18. A method of operating a processor having a first mode of operation and a second mode of operation, wherein the first mode of operation represents a compatibility mode of operation recognized by an operating system implemented by the processor and the second mode represents an extended mode of operation not recognized by the operating system, a state of said processor in said first mode of operation comprising a first plurality of variables, said first plurality of variables comprising a return address, a state of said processor in said second mode of operation comprising a second plurality of variables in addition to said first plurality of variables, said method comprising:

in case of an interrupt or exception occurring during said second mode of operation, performing the steps of saving said second plurality of variables and said return address to a buffer memory, replacing said return address with an address of a trampoline instruction, and switching said processor to said first mode of operation, wherein said steps are performed independently of the operating system;

initiating a routine for handling said interrupt or exception in said first mode of operation; and when said trampoline instruction is executed, switching said processor from said first mode of operation to said second mode of operation, reading said second plurality of variables from said buffer memory and jumping to said return address.

19. The method of claim 18, wherein said second plurality of variables is representative of at least one of contents of a plurality of registers of said processor and a state of a device connected to said processor.

20. The method of claim 18, further comprising swapping one of said first plurality of variables and one of said second plurality of variables in case of said interrupt or exception occurring during said second mode of operation and when executing said trampoline instruction.

* * * * *